United States Patent [19]

Fenzi

[11] Patent Number: 5,389,301
[45] Date of Patent: Feb. 14, 1995

[54] FORMULATION TO PROTECT FROM THE CORROSION METAL-COATING MIRRORS AND SIMILAR AND PROCEDURE FOR THE PRODUCTION THEREOF

[75] Inventor: Fernando Fenzi, Milan, Italy

[73] Assignee: Fenzi S.p.A. Vernici Ed Accessori Vetrari, Tribiano, Italy

[21] Appl. No.: 33,283

[22] Filed: Mar. 16, 1993

[30] Foreign Application Priority Data

Mar. 23, 1992 [IT] Italy ............... MI92 A 000664

[51] Int. Cl.⁶ .......................................... C23F 11/14
[52] U.S. Cl. ............................ 252/394; 106/14.34; 106/14.37; 106/14.42; 106/14.44; 428/912.2; 428/432; 428/430; 428/440; 427/409; 427/410; 427/413; 427/419.2
[58] Field of Search ............... 425/426; 252/387, 394; 106/14.34, 14.42, 14.44, 14.37; 428/912.2, 432, 440, 430; 523/172; 427/409, 410, 413, 419.2

[56] References Cited

U.S. PATENT DOCUMENTS

| | | | |
|---|---|---|---|
| 3,637,385 | 1/1972 | Hayes et al. | 430/198 |
| 4,707,405 | 11/1987 | Evans et al. | 428/336 |
| 5,075,134 | 12/1991 | Sandford | 428/426 |
| 5,156,917 | 10/1992 | Sandford | 428/426 |
| 5,166,432 | 11/1992 | Weitkamp et al. | 563/106 |

FOREIGN PATENT DOCUMENTS

| | | |
|---|---|---|
| 9110563 | 7/1991 | WIPO . |
| 9116197 | 10/1991 | WIPO . |

*Primary Examiner*—Robert L. Stoll
*Assistant Examiner*—Valerie Fee
*Attorney, Agent, or Firm*—Ladas & Parry

[57] ABSTRACT

A lead-free anticorrosive formulation applied in layer form for the protection of metal films applied to transparent supports, said formulation comprising a binder consisting of at least one resin selected from the group consisting of isomerized rubber, urethane oil, alkyd, modified alkyd, acrylic, phenol and epoxy resins; at least one melamine resin; a corrosion-inhibiting pigment consisting cyanoacetylurea; fillers; metal oxides; at least one solvent; and adhesion promoting additives. Said formulation being particularly useful with mirrors, reflective surfaces and the like.

8 Claims, No Drawings

FORMULATION TO PROTECT FROM THE CORROSION METAL-COATING MIRRORS AND SIMILAR AND PROCEDURE FOR THE PRODUCTION THEREOF

The object of the present invention is an anticorrosive formulation based on organic resins and non-heavy metal pigments, which is particularly suitable for the protection of thin metal films as used for example in the production of mirrors. There comes also within the scope of the invention a procedure for the production of such anticorrosive formulation.

As is known, the thin metal films used in the production of mirrors, or on supports other than glass such as sheets of polycarbonate or similar, are usually comprised of a thin layer of silver and a layer of copper. In the case of mirrors, these layers are deposited on sheets of glass and their overall thickness normally ranges from 800 to 1500 Angstroms. Such films are therefore an integral and essential part of a mirror, and even though their thickness may vary within the above-mentioned limits they are always of very limited thickness, for which reason they are liable to localized corrosion in the course of time, due to various types of oxidation, and to attack by chlorides, sulphurs and atmospheric agents.

To obviate these disadvantages use has been made of various types of corrosion inhibitors which, however, have not shown themselves to be sufficiently effective in preventing corrosion.

Arrangements were therefore made to coat such thin metal films with various types of organic resin compositions, but even these, being generally pervious to certain chemical substances capable of corroding metal, have not made it possible to solve the problem of protection in the long term.

To increase the protective efficiency of such organic coating compositions, arrangements were made to add to these compositions pigments containing lead, such as oxides, sulphates and carbonates. The use of lead and of certain heavy metals in various formulations as used in many technological industries is, however, known to be subject to restrictions and also to prohibitions under legal regulations because of the harmfulness and toxicity of these metals. The search for compositions containing anticorrosive pigments was therefore directed towards substitute pigments capable of ensuring corrosion protection similar to that provided by lead-bearing pigments, without having their toxicity.

There have therefore recently been proposed various types of anticorrosive formulations based on organic resins mixed with cyanamide pigments of metals other than lead, including preferably calcium, zinc and magnesium. Such pigments are compatible with the metal layers to which they are applied in the form of a coating layer, offering good protection against corrosion to metal surfaces; however, such anticorrosive compositions based on organic resins admixed with calcium cyanamide or zinc cyanamide, that is to say, with a single cyanamide salt of a non-heavy metal, have hardening times which are not always suited to the current rate of manufacture of mirrors and similar and are not always capable of maintaining unchanged the necessary characteristics of hardness and mechanical strength.

There have also been proposed anticorrosive organic compositions containing, instead of lead compounds, inhibitors such as zinc cynamide and/or dicyandiamide.

There is therefore posed the problem of developing an anticorrosive formulation incorporating anticorrosive pigments devoid of lead and/or chrome capable of eliminating, or at least drastically reducing, the disadvantages and limitations inherent in the protective compositions currently used.

Within the scope of this problem, one purpose of the invention is to develop an anticorrosive formulation for the coating and protection of thin metal films as used in the production of mirrors and similar such as to prove compatible with the metal layer to which it is applied, that is to say, to withstand both localized corrosion and attacks of other types, so that it shall prove stable under normal conditions of storage and at the same time react during final heat treatment to ensure optimum crosslinking and therefore optimum adherence to the underlying layer. Another purpose of the invention is to develop an anticorrosive formulation of the type specified above which will make it possible to obtain a coating layer, having significant characteristics of hardness, elasticity and strength, within very short times.

A further purpose of the invention is to develop a lead-free anticorrosive formulation which will make it possible to limit the penetration of corrosion at the edges of the metal layers, according to values compatible with the demands of the market.

These and other additional purposes, which should become clearly apparent from the description which follows, are achieved by a lead-free anticorrosive formulation for the protection of metal films applied to transparent supports such as mirrors and similar, comprising a binder consisting of at least one resin chosen from among isomerized rubber, urethane oil, alkyd and modified alkyd, acrylic, phenol rand epoxy resins, at least one melamine resin and corrosion-inhibiting pigments consisting of cyanoacetylurea, such formulation also including fillers, metal oxides, at least one solvent and adhesion-promoting additives so as to form a compound which can be applied in the form of a layer to such metal films.

The formulation according to the invention also provides that such organic resin shall be present within a concentration range of 15 to 40% by weight of the formulation, such melamine resin shall be present within a range of 2 to 12% by weight of the formulation, while such corrosion-inhibiting pigments shall overall be present within a range of 0.25% to 10% by weight and in a preferred formulation within a range of 0.5 to 5% of the same end formulation and that such fillers shall be comprised comprised of one or more compounds chosen from among aluminium and magnesium silicates, metal oxides and barium sulphate, together with an anti-skin additive of methylethyl ketoxime type, such adhesion-promoting additives being of organo-functional silane type, whilst such solvent shall be preferably chosen from among xylene, butyl acetate and similar or water.

A further object of the present invention is a procedure for the development of the anticorrosive formulation referred to above which consists of the following phases:

a—mixing in cold condition, with vigorous stirring, at least one organic resin chosen from among isomerized rubber, urethane oil, alkyd and modified alkyd, acrylic, phenol, epoxy and similar resins, anticorrosive pigments consisting of a mixture of cyanoacetylurea, fillers, metal oxides, adhesion-promoting additives and solvents;

b—subjecting such mixture of constituents to vigorous grinding action in order to obtain particles smaller than 15 microns.

Where the formulation is of the heat-setting type provision is also made for a further phase of addition of a melamine or urea resin.

For a more comprehensive explanation and definition of the various features of the anticorrosive formulation forming the subject of the invention, there is now set forth a detailed example, indicative and nonrestrictive, of a practical development of four different formulations, indicated by the letters A-B-C-D, which have shown themselves to be particularly effective in the protective coating of mirrors and similar.

The values given in the table of the following example are expressed as a percentage weight of the total for the formulations:

| COMPONENTS | FORMULATIONS | | | |
|---|---|---|---|---|
| | A | B | C | D |
| | per cent | | | |
| Alkyd resin Tall oil/DCO | 31.8 | 30.0 | 29.0 | 30.0 |
| Additives | 0.1 | 0.1 | 0.1 | 0.1 |
| Phenol resin | 4.5 | 4.5 | 5.0 | 5.0 |
| Melamine resin | 8.0 | 9.0 | 10.0 | 10.0 |
| Xylene | 9.5 | 11.0 | 10.0 | 11.5 |
| Methylethyl ketoxime | 0.1 | 0.1 | 0.1 | 0.1 |
| Suspension agent | 3.0 | 2.4 | 2.0 | 2.0 |
| Magnesium silicate | 14.0 | 14.9 | 9.8 | 15.0 |
| Metal oxides | 14.6 | 15.0 | 17.0 | 9.3 |
| Cyanoacetylurea | 2.0 | 3.0 | 4.0 | 5.0 |
| Fillers | 13.0 | 10.0 | 13.0 | 12.0 |
| | 100 | 100 | 100 | 100 |

The compositions or formulations set forth in the table were prepared by mixing the various listed constituents, with the exception of the melamine resin which was added subsequently and then dispersed by means of a paddle stirrer; afterwards they were subjected to grinding with the aid of a ball mill in order to obtain particles smaller than 15 microns. Such formulations were then applied to the rear surface of the metal coating of a mirror in the form of a layer or film with a thickness of 25 to 40 microns, such thickness being determined on the dry film.

The specimen mirrors thus obtained were then subjected to hardening of the coating, by infra-red radiation, and then evaluated in terms of their anticorrosive properties by means of the stability tests included in the processing standards, that is to say, by means of the salt spray tests which provide for the performance of tests under one of the following conditions:

a) Temperature: 35° C.; Time: 300 hours; Solution of NaCl in H$_2$O: 20%, b) Temperature: 40° C.; Time: 300 hours; Solution of NaCl in H$_2$O: 5%.

These tests were carried out to establish the effectiveness of the protection applied to the specimen mirrors, with particular reference to the edges of the mirrors.

In the following table are shown the mean values of corrosion, in millimetres, calculated on the four sides of the tested mirror, coated with the four formulations A-B-C-D referred to above.

| | A | B | C | D |
|---|---|---|---|---|
| Thickness of coating in dry condition expressed in microns: | 40 | 40 | 25 | 30 |

-continued

| | A | B | C | D |
|---|---|---|---|---|
| Corrosion (in mm): | <0.3 | <0.3 | <0.4 | <0.35 |

The same specimen mirrors were also tested to determine their resistance to solvents (lubricants), the results being as follows:

| Type of test | A | B | C | D |
|---|---|---|---|---|
| rubbing with xylene | >50 | >50 | >50 | >60 |

In practice it was found that the particular binding system (resin+cyanoacetylurea) used in the anticorrosive formulation forming the object of the present invention proved capable of ensuring not only protection against corrosion of the thin metal films comparable with and possibly greater than that obtainable with lead-based pigments, but also greater resistance to attack by solvents.

Furthermore, with the described formulation it is possible to obtain cross-link times in an infra-red radiation furnace of the order of 2–4 minutes at temperatures ranging from 110 to 170° C.

Obviously, to the invention as described above according to some of its preferred developed forms there may be introduced in practice modifications and variants of an equivalent nature, without departing from the scope of protection of the invention.

I claim:

1. A lead-free anticorrosive formulation applied in layer form for the protection of metal films applied to transparent supports wherein said formulation contains a binder consisting of a resin selected from the group consisting of isomerized rubber, urethane oil, alkyd and modified alkyd, acrylic, phenol and epoxy resins; at least one melamine resin; a corrosion-inhibiting pigment consisting of cyanoacetylurea; fillers; metal oxides; at least one solvent; and adhesion-promoting additives.

2. The formulation according to claim 1, wherein the organic resin is present within a concentration range of 15 to 40% by weight of the formulation; the melamine resin being present within a range of 2 to 12% by weight of said formulation; and the corrosion-inhibiting pigment is present within a range of 0.25% to 10% by weight.

3. The formulation according to claim 1, wherein the corrosion-inhibiting pigment is present within a range of 0.5 to 5% of said formulation.

4. The formulation according to claim 1, wherein said fillers are comprised of one or more compounds selected from the group consisting aluminum silicates, magnesium silicates or mixtures thereof, barium sulphate, or mixtures thereof together with an anti-skin additive being methylethyl ketoxime; said adhesion-promoting additives selected from organo-functional silanes; and said solvent is selected from the group consisting of xylene, butyl acetate and water.

5. The formulation of claim 1 wherein the transparent support is a mirror.

6. A process for the manufacture of the anti-corrosive formulation in any one of claims 1 to 5, wherein said process consists of the following steps:

a) mixing in cold condition, with vigorous stirring, at least one organic resin selected from the group consisting of isomerized rubber, urethane oil, alkyd and modified alkyd, acrylic, phenol, and epoxy resins; an anti-corrosive pigment consisting of cyanoacetylurea; fillers; metal oxides; adhesion-promoting additives and solvents.

b) subjecting said mixture of constituents to vigorous grinding action in order to obtain particles smaller than 15 microns.

7. The process according to claim 6, wherein said corrosion inhibiting pigment is added during phase a) in a percentage ranging from 0.5 to 5% by weight of the formulation.

8. The process according to claim 6, including a subsequent step of adding a melamine or urea resin wherein the formulation is set by heating.

* * * * *